United States Patent Office 3,748,328
Patented July 24, 1973

3,748,328
2-AMIDOCEPHALOSPORINS
Milton Wolf, West Chester, and John H. Sellstedt, King of Prussia, Pa., assignors to American Home Products Corporation, New York, N.Y.
Continuation-in-part of abandoned application Ser. No. 107,437, Jan. 18, 1971, which is a continuation-in-part of application Ser. No. 843,841, July 22, 1969, now Patent No. 3,635,953, dated Jan. 18, 1972, which in turn is a continuation-in-part of abandoned application Ser. No. 760,090, Sept. 17, 1968. This application Sept. 17, 1971, Ser. No. 181,491
Int. Cl. C07d 99/24
U.S. Cl. 260—243 C                          2 Claims

ABSTRACT OF THE DISCLOSURE

This invention is concerned with novel 2-amidocephalosporins and with methods for their preparation. The compounds are antibiotically active and/or are useful as intermediates for the preparation of known compounds.

CROSS REFERENCE TO RELATED APPLICATIONS

Figure 1:
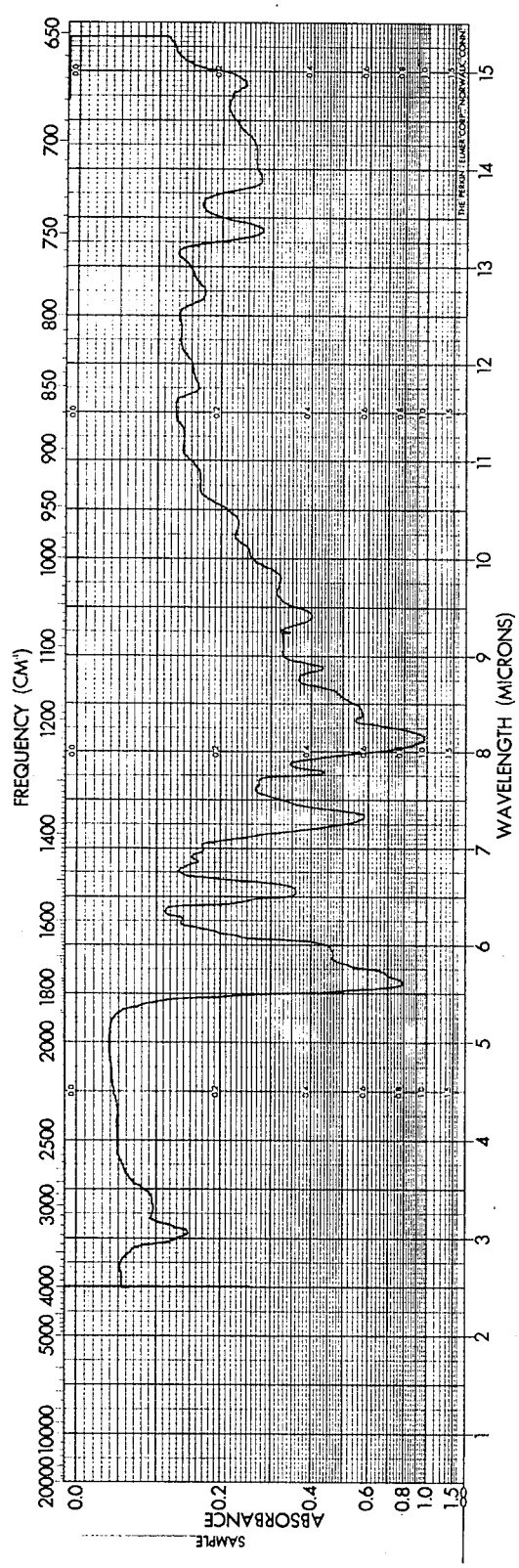

This application is a continuation-in-part of U.S. patent application Ser. No. 107,437 filed Jan. 18, 1971, now abandoned which is a continuation-in-part of application Ser. No. 843,841 filed July 22, 1969, now U.S. 3,635,953, issued Jan. 18, 1972, which is a continuation-in-part of Ser. No. 760,090 filed Sept. 17, 1968, which is now abandoned.

DESCRIPTION OF THE INVENTION

This invention is concerned with novel compounds of Formula A:

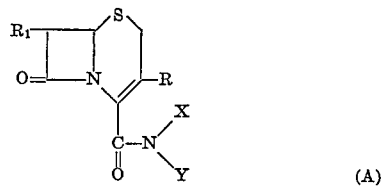

(A)

wherein $R_1$ is selected from the group consisting of

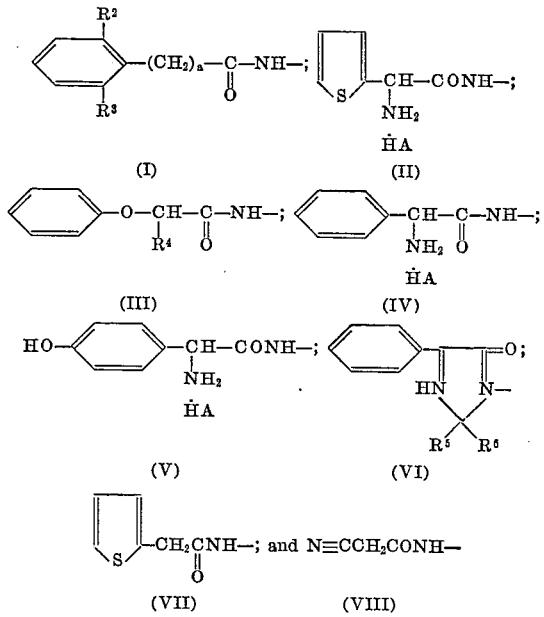

wherein R is selected from the group consisting of methyl, N-pyridiniummethyl and (lower)alkanoyloxymethyl; $R^2$ and $R^3$ are selected from the group consisting of hydrogen and lower alkoxy; $R^4$ is selected from the group consisting of hydrogen, lower alkyl and phenyl; $R^5$ and $R^6$ when taken separately are selected from the group consisting of hydrogen and lower alkyl, and when taken together with the carbon atom to which they are attached, complete a ring selected from the group consisting of cycloalkyl containing from about 4 to about 8 carbon atoms and piperidine; $a$ is an integer from 0 to 1; A is the anion of a pharmaceutically acceptable acid; and X and Y are electron withdrawing groups.

As known to those skilled in the art and to be included in the compounds of this invention are those compounds of Formula A wherein 3-position group is modified by known chemical procedures to afford compounds which are substituted at the 3-position with other substituents, for example, methyl, N-pyridiniummethyl or lower alkanoyloxymethyl groups such as acetoxymethyl, propanoyloxymethyl and the like.

As known to those skilled in the chemical art, included in those groups which are electron withdrawing when X and Y are taken separately are, for example: cyano, nitro, trifluoromethylsulfonyl, 2,4,6-trimethylbenzoyl, 2,3, 4,6-tetramethylbenzoyl, carb(lower)alkoxy, di(lower)alkylcarbamyl, lower alkylsulfonyl, di(lower)alkylsulfamyl, di(lower)alkylamino(lower)akylsulfonyl, lower alkanoyl (e.g. tert.-butyryl), cyclo(lower)alkanoyl, aroyl (e.g. naphthoyl and furoyl), substituted aroyl, arylsulfonyl (e.g. naphthylsulfonyl), pyridylsulfonyl, furylsulfonyl, substituted arylsulfonyl,

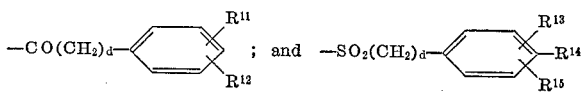

wherein $R^{11}$ and $R^{12}$ are, for example, hydrogen, lower alkyl, halogen, trifluoromethyl, lower alkoxy, phenyl, phenoxy, nitro, lower alkylsulfonyl, di(lower)alkylsulfamyl; $R^{13}$, $R^{14}$ and $R^{15}$ can be hydrogen, nitro, halogen, trifluoromethyl, lower alkyl, lower alkoxy, lower alkylsulfonyl, lower alkylthio, di(lower)alkylsulfamyl, di(lower)alkylcarbamyl, cyano and carb(lower)alkoxy; and the integer $d$ is from 0 to about 6.

As is also known to those skilled in the chemical art, included in those cyclic electron withdrawing groups when X and Y are taken together are, for example:

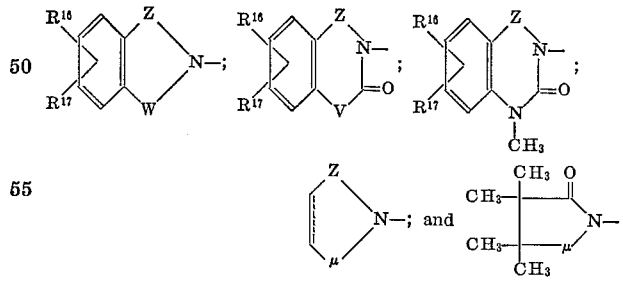

wherein $R^{16}$ and $R^{17}$ when taken separately can be hydrogen; lower alkyl; lower alkoxy; halogen, phenyl; phen(lower)alkyl; lower alkoxyphenyl; aryl, e.g. 2-pyridyl, 4-pyridyl, trifluoromethyl; nitro; di(lower)alkylamino; sulfamido; carb(lower)alkoxy; cyano; lower alkylthio; lower alkylsulfonyl, and when $R^{16}$ and $R^{17}$ are joined, they complete a benzene ring fused to the existing benzene ring to form therewith a naphthalene ring; Z is selected from the group consisting of sulfonyl and carbonyl; W is selected from the group consisting of sulfonyl, carbonyl and methylene; V is selected from the group consisting of oxygen, sulfur and methylene; μ is selected from the group consisting of carbonyl and methylene; and the broken line indicates the presence of a single or double bond between these two positions.

The preferred embodiments of the compounds of this invention are those compounds of Formula $A_1$ wherein X and Y are concatenated to form a saccharyl or substituted saccharyl group. These compounds are designated by the following formula:

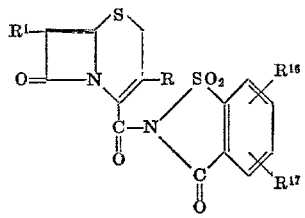

(A₁)

and the acid-addition salts thereof; wherein R, $R^1$, $R^{16}$ and $R^{17}$ are defined as above.

The term "lower alkyl" as conventionally used herein, alone or in conjunction with the other designated groups, is intended to encompass straight chain or branched chain alkyl groups containing from one to about six carbon atoms e.g. methyl, ethyl, propyl, isopropyl, butyl, isobutyl, pentyl, 2-ethylpropyl, hexyl, 2-propylpropyl, and the like. Similarly, the terms "lower alkoxy" and "lower alkanoyl" as used herein, alone or in conjunction with other designated groups, are intended to encompass straight chain or branched chain groups also containing from one to about six carbon atoms. The term "halogen" as used conventionally herein, alone or attached to other designated groups, is intended to encompass chlorine, bromine, iodine and fluorine. As will also be understood, the ringed substituents, whether carbocyclic e.g. phenyl, benzyl etc. or heterocyclic e.g. 2-pyridyl, 4-pyridyl, and the like may also be substituted by one or more of such usual substituents as those set forth for $R^{16}$ and $R^{17}$ above. Similarly, the naphthalene ring resulting when $R^{16}$ and $R^{17}$ are joined as referred to above, may also carry one or more of the same substituents also referred to above. By the phrase "electron withdrawing group" is meant an electrophilic group which will inductively withdraw electrons from the carbonyl portion of the 2-amido groups of the compounds of this invention thereby making these groups more liable to cleavage by a nucleophilic agent e.g. water, alkali metal hydroxides, tertiary amines, quinoline and the like, to afford a carboxylic acid group.

The novel 2-amidocephalosporins of this invention may be prepared generally by reacting a starting cephalosporin or 7-acylated cephalosporanic acid with a suitable reactive nitrogen compound which will replace the hydroxy moiety of the carboxyl group of the cephalosporin with a group of the formula:

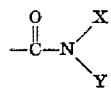

wherein X and Y have the same meaning as hereinbefore defined. Such reactions are well known to those skilled in the art and several thereof are hereinafter schematically illustrated for the preparation of the 2-amidocephalosporins of this invention.

(I)

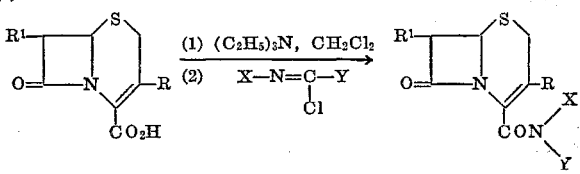

(II)

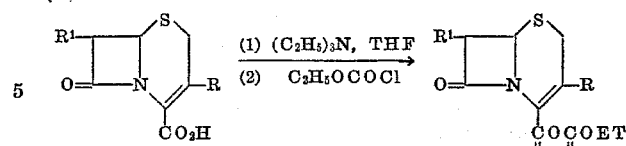

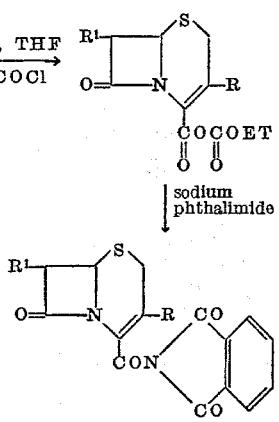

(III)

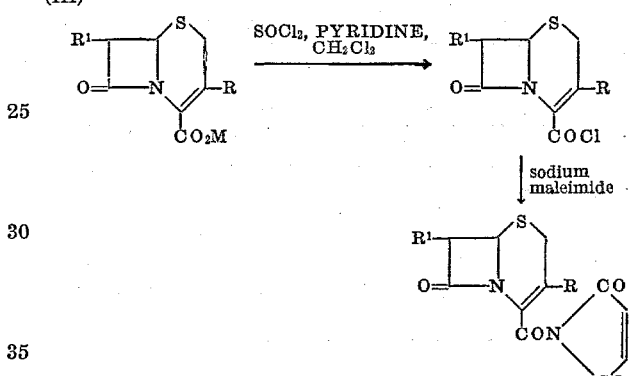

(IV)

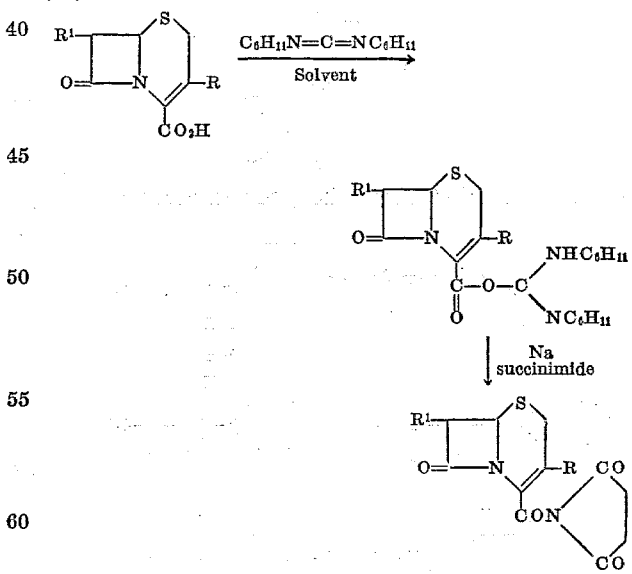

Thus, for example, the preferred compounds (A₁) of this invention may be prepared generally by reacting, preferably in the cold, a 3-halosaccharin derivative e.g. 3-chloro-1,2-benzisothiazole 1,1-dioxide or an appropriately substituted derivative thereof, with a cephalosporin in an organic solvent, such as, anhydrous methylenechloride which contains an acid acceptor e.g. triethylamine. Thereafter, the crystalline material is filtered off and the filtrate is concentrated under vacuum at above ambient temperatures. The residue may then be redissolved and crystallized from a suitable organic solvent system e.g. benzene-hexane.

The 3-chloro-1,2-benzisothiazole 1,1-dioxide starting material is commercially available, while the $R^{16}$ and $R^{17}$ substituents on the benzo moiety of the saccharin derivatives may be introduced by well known conventional procedures. The cephalosporins are either obtainable commercially or may be prepared by procedures well known in the literature. Similarly, the reactive nitrogen compounds employed for providing the aforesaid amido groups are also obtainable commercially or, in those instances where they are not available, they may be synthesized readily by standard organic procedures described in the chemical literature and known to those skilled in the art.

There is also available an alternative method for preparing the new and novel 2-amidocephalosporins of the present invention. This new and novel alternative method is especially useful for preparing the new compounds of this invention which are derivatives of synthetic α-amino and 1-amino cephalosporins, which contain an additional reactive group to which the haloimine derivatives of other reactants might also attach. In this method, the 2-amido moiety is already present on the 7-aminocephalosporanic acid starting material, which is then acylated in the 7-position in the usual manner. Generally, this method comprises first preparing a 2-amido derivative of a cephalosporin e.g. cephalothin and the like where the 2-amido group has no active hydrogens to react with $PCl_5$. This is accomplished by admixing a particular starting cephalosporin with a suitable organic solvent e.g. methylene chloride followed by addition of an acid acceptor, such as triethylamine, trimethylamine and the like to form a solution. Thereafter, this solution is admixed, preferably in the cold, with an appropriate imino halide derivative. When the amidation is complete, the solution is washed, dried and concentrated under vacuum to afford a residue of the 2-amido derivative of the starting cephalosporin which may then be crystallized from a suitable organic solvent system e.g. ether in benzene. Thereafter, the 2-amido derivative of the cephalosporin either as the residue or in the crystallized form is dissolved in methylene chloride containing an organic base e.g. N,N-dimethylaniline, quinoline, N-ethylmorpholine and the like and then reacted with a phosphorus penthalide, such as, phosphorus pentachloride or phosphorus pentabromide to afford the corresponding 7-haloimide. Alternatively, the organic base is preferably added directly to the original reaction mixture after the addition of the imino halide derivative thereby circumventing the above-described isolation and crystallization procedure. This 2-amido-7-haloimido derivative of the cephalosporin is then admixed with a lower alkanol e.g. methyl alcohol, ethyl alcohol, propyl alcohol, butyl alcohol, and the like to form a hydrohalide acid-addition salt of the 7-alkoxyimido-2-amido derivative of the cephalosporin wherein the halogen atom of the 7-imido moiety has been replaced by the alkoxy portion of the lower alkanol employed. Thereafter, the reaction mixture is subject to aqueous hydrolysis to afford the corresponding 2-amido-7-aminocephalosporanic acid as the hydrohalide salt. The basic form of this salt is obtained by treating the hydrohalide for a short time with the acid acceptor, such as triethylamine, sodium bicarbonate and the like, in a solvent, preferably water.

Acylation of this 2-amido-7-aminocephalosporanic may then be undertaken by conventional procedures, as referred to hereinbefore, to afford the antibiotically active 2-amidocephalosporins of the present invention. In those instances where it is deemed desirable to obtain the acid forms of the cephalosporins per se; i.e., without the 2-amido substituent, said acid forms may be obtained by simple hydrolysis. For example, the 2-amidocephalosporins upon treatment for a sufficient length of time with water or a mixture of water and a miscible organic solvent such as pyridine or quinoline, at a pH of from about 1.5 to about 9 affords the deamidated cephalosporins. The preferred pH range is from about 2.7 to about 5. The hydrolysis is performed at a temperature of from about 20° to about 35° C.

The antibiotically active 2-amidocephalosporins of the present invention possess valuable biological activity. In particular, in standard and accepted biological tests these compounds of the invention which have non-toxic amido substituents are, therefore of value as antibacterial agents, nutritional supplements in animal feeds; agents for the treatment of mastitis in cattle; and as therapeutical agents in poultry and animals, and in the treatment of infectious diseases caused by gram-positive and gram-negative bacteria, upon either parenteral or oral administration.

As will be understood by those skilled in the art, the 2-amidocephalosporins of this invention may be utilized as such, or in the cases of those compounds of the α-amino or 1-amino type, they may be in the form of the pharmacologically acceptable, acid-addition salts thereof prepared by the reaction of the selected antibiotically active compound with a suitable organic or inorganic acid e.g. hydrochloric, hydrobromic, fumaric, citric and the like, as is conventional in this art.

As will also be understood by those skilled in the art, the antibiotically active 2-amidocephalosporins of this invention may be utilized in pharmacological compositions in association with pharmacologically acceptable carriers, e.g. in suitable injectable form, including solutions and suspensions; or orally as tablets, capsules, and the like, utilizing conventional solvents, suspensoids, excipients, and the like. As previously indicated, when the compounds of this invention are employed, they may be administered orally or parenterally. Naturally, the dosage of these compounds will vary somewhat with the form of admininstration and the particular compound chosen. Further, it will vary with the particular subject under treatment. In general, the compounds of this invention are most desirably administered at dosage levels corresponding to those of commercially available cephalosporins. Although variations from these dosages will occur, these dosages will generally afford effective results without causing any harmful or deleterious side effects.

Figure 2:
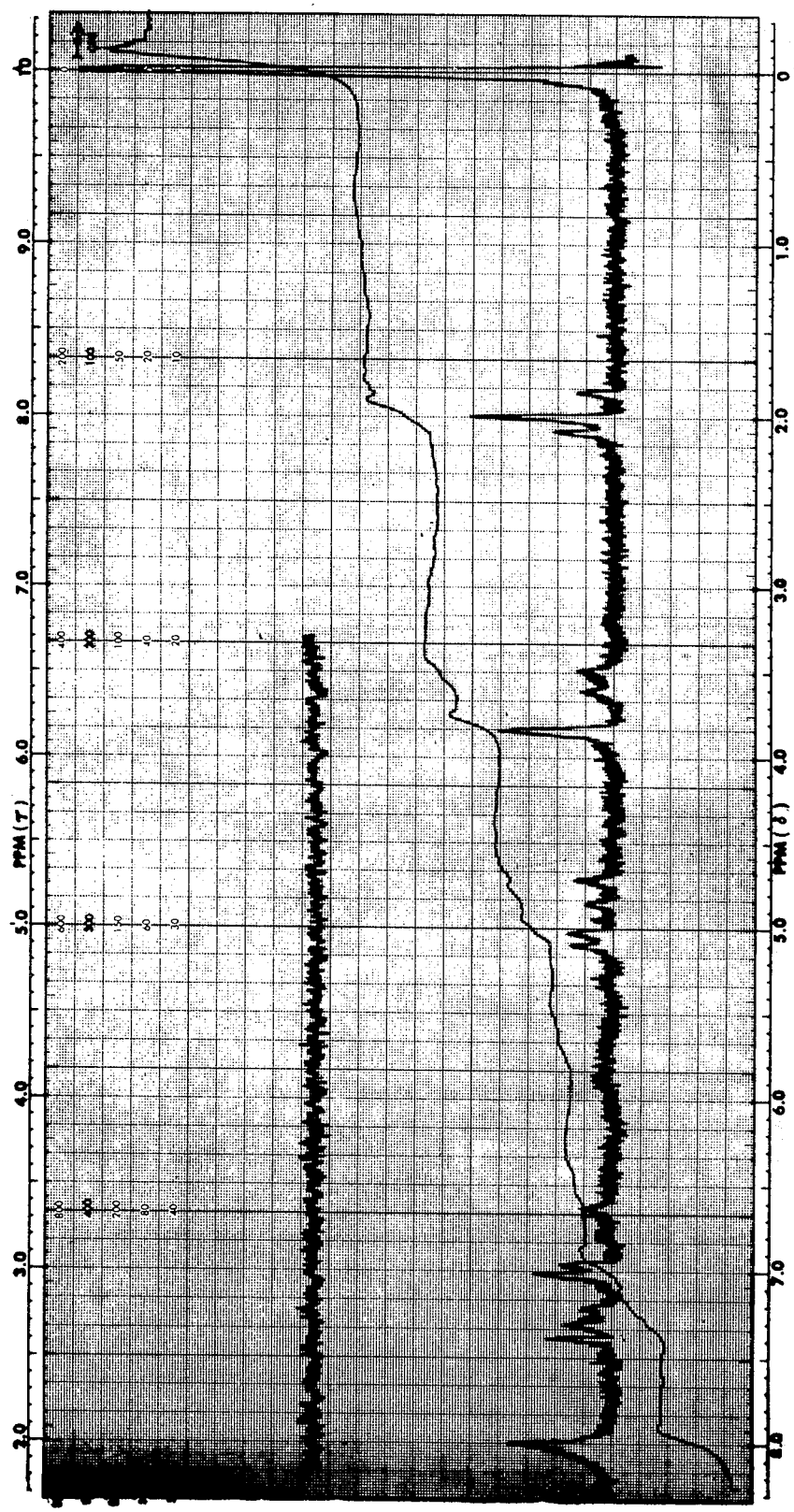

FIG. 1 is the I.R. Curve of the compound of Example II and FIG. 2 is the N.M.R. spectrum of Example II.

The following examples are given by way of illustrating some embodiments of this invention.

EXAMPLE I

Saccharimide of cephalothin

Triethylammonium 3 - acetoxymethyl-8-oxo-5-thia-7-(thiophene-2-acetamido) - 1 - azabicyclo[4.2.0]oct-2-en-2-carboxylate (3.3 g., 0.00663 mole) is dissolved in methylene chloride (100 ml.) and the solution is cooled to 3° C. Then 3-chloro-1,2-benzisothiazole 1,1-dioxide (1.3 g., 0.00663 mole) is added to the magnetically stirred solution all at once. The solution is allowed to warm to room temperature overnight, giving white crystals that were washed with cold methylene chloride to afford the anhydride of cephalothin, M.P. 160° (dec.).

Analysis.—Calcd. for $C_{32}H_{30}N_4O_{11}S_4$ (percent): C, 49.60; H, 3.90; N, 7.23. Found (percent): C, 49.49, 49.52; H, 4.07, 3.99; N, 7.76.

The saccharimide is then isolated from the filtrate by concentration in vacuo at 40°.

EXAMPLE II

Saccharimide of cephalothin

Cephalothin acid (2.02 g., 5.08 mmole) is dissolved in cold dichloromethane (50 ml.) with the addition of triethylamine (0.514 g., 5.08 mmole). This solution is added over one-half hour to a solution of pseudosaccharin chloride (1.07 g., 5.34 mmole) in dichloromethane (50 ml.) at room temperature. The solution is stirred for two hours and kept overnight. Cephalothin anhydride (0.93 g.) is filtered off and crystallized from boiling acetonitrile (40 ml.), giving a white crystalline solid (0.35 g.), M.P. 179° (dec.).

*Analysis.*—Calcd. for $C_{32}H_{30}N_4O_{11}S_4$ (percent): C, 49.60; H, 3.90; N, 7.23. Found (percent): C, 49.50; H, 4.02; N, 7.18.

The original dichloromethane filtrate is washed with water, dilute cold sodium bicarbonate, brine, dried with magnesium sulfate, and concentrated in vacuo at 40° giving a foam (1.68 g.). It is crystallized from benzene-hexane to give 0.67 g. the saccharimide of cephalothin. M.P. 127–167° (dec.).

*Analysis.*—Calcd. for $C_{23}H_{19}N_3O_6S_3$ (percent): C, 49.19; H, 3.41; N, 7.48; S, 17.13. Found (percent): C, 49.19; H, 3.61; N, 7.29; S, 17.16.

EXAMPLE III

By methods analagous to those employed in Example II the following compounds are prepared:

5-methoxysaccharimide of cephalothin;
5,6-dichlorosaccharimide of cephalothin;
4-chloro-6-iodosaccharimide of cephalothin;
7-fluoro-5-phenethylsaccharimide of cephalothin;
5-ethoxyphenylsaccharimide of cephalothin;
5-(N-ethyl-N-methylamino)saccharimide of cephalothin;
6-carbomethoxysaccharimide of cephalothin;
5-chloro-6-methylthiosaccharimide of cephalothin;
6-carbethoxysaccharimide of cephalothin; and
5-methylsulfonylsaccharimide of cephalothin.

EXAMPLE IV

By the procedure employed in Example II, the following compounds are prepared:

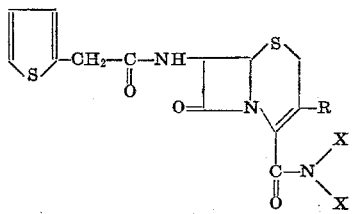

wherein X, Y and R when taken separately are defined as follows:

| X | Y | R |
|---|---|---|
| N,N-dipropylaminobutylsulfonyl | naphthtoyl | $CH_2OCOCH_3$ |
| Cyano | 2,4-dimethylbenzoyl | $CH_3$ |
| Cyclobutanecarbonyl | p-Fluorophenacetyl | $CH_2OCOCH_3$ |
| Cyclohexanecarbonyl | Trifluoromethylsulfonyl | $CH_2OCOCH_3$ |
| Furoyl | Cyano | $CH_2OCOCH_2CH_3$ |
| N,N-dimethylsulfamylphenpropionyl | Carbopropoxy | $CH_2OCOCH_3$ |
| p-Propylphenylsulfonyl | Acetyl | $CH_2\overset{+}{-}N\langle\bigcirc\rangle$ |
| 2-naphthylsulfonyl | p-Butoxybenzoyl | $CH_2OCOCH_2CH_3$ |
| Phenbutyryl | Nitro | $CH_3$ |
| 2-furylsulfonyl | Caproyl | $CH_2OCOCH_3$ |

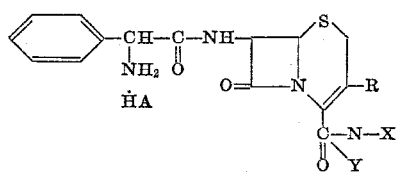

wherein X, Y and R when taken separately are defined as follows:

| X | Y | R |
|---|---|---|
| Propionyl | p-Iodobenzylsulfonyl | $CH_2OCOCH_2CH_3$ |
| Acetyl | Butyryl | $CH_2OCOCH_3$ |
| Propionyl | Benzoyl | $CH_2OCOCH_2-CH_3$ |
| Cyano | Phenylsulfonyl | $CH_2OCOCH_3$ |
| 2,4,6-trimethylbenzoyl | Phenetylsulfonyl | $CH_2-\overset{+}{N}\langle\bigcirc\rangle$ |
| Do | p-Methoxyphenylsulfonyl | $CH_3$ |
| N,N-dimethylcarbamyl | N,N-dimethylaminoethylsulfonyl | $CH_2OCOCH_3$ |
| 2,3,5,6-tetramethylbenzoyl | p-Methylthiophenylsulfonyl | $CH_2OCOCH_2CH_3$ |
| Cyclopentanecarbonyl | m-Nitrophenethylsulfonyl | $CH_2OCOCH_3$ |

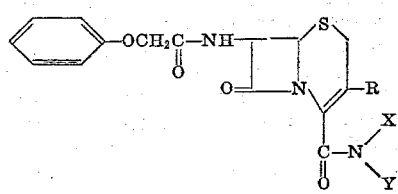

wherein X, Y and R when taken separately are defined as follows:

| X | Y | R |
|---|---|---|
| Methylsulfonyl | 2-bromo-4-nitrophenylsulfonyl | $CH_2OCOCH_3$ |
| N,N-dimethylsulfamyl | m-(N,N-dimethylcarbamyl)phenylsulfonyl | $CH_3$ |
| Carbohexoxy | p-Methylsulfonylphenylsulfonyl | $CH_2OCOCH_2CH_3$ |
| Carbethoxy | p-(N,N-diethylsulfamyl)phenylsulfonyl | $CH_2OCOCH_3$ |
| Trifluoromethylsulfonyl | 4-cyano-2-iodophenylsulfonyl | $CH_2-\overset{+}{N}\langle\bigcirc\rangle$ |
| Cyano | 2-fluoro-4-nitro-phenylsulfonyl | $CH_2OCOCH_3$ |
| Pentylsulfonyl | p-Carbobutoxyphenylsulfonyl | $CH_2OCOCH_2CH_3$ |

EXAMPLE V

The procedure of Example II is repeated to react 2-[(7-amino-3-methyl or acyloxymethyl-8-oxo-5-thia-1-azabicyclo[4.2.0]oct-2-en-2-ylcarbonyl]-1,2-benzisothiazol-3(2H)-one 1,1-dioxide with an acyl chloride to prepare the compounds listed below:

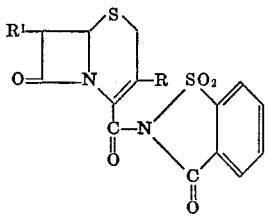

wherein $R^1$ and R are defined as follows:

| $R^1$ | R |
|---|---|
| 2-phenoxyacetamido | $CH_3$ |
| Thiophene-2-acetamido | $CH_2OCOCH_2CH_3$ |
| 2-amino-2-phenylacetamido HA | $CH_2OCOCH_2CH_3$ |
| 2-phenylacetamido | $CH_2OCOCH_2CH_3$ |
| 2-cyanoacetamido | $CH_3$ |
| 2-(4-hydroxyphenyl) glycylamido | $CH_2OCOCH_3$ |
| 2,6-dimethoxyphenylacetamido | $CH_3$ |
| 2-(2-thiophene) glycylamido HA | $CH_3$ |

We claim:
1. A compound of the formula:

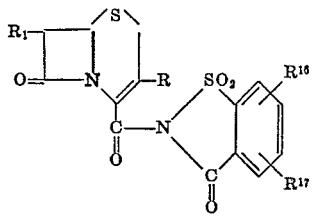

in which
$R_1$ is a member selected from the group consisting of

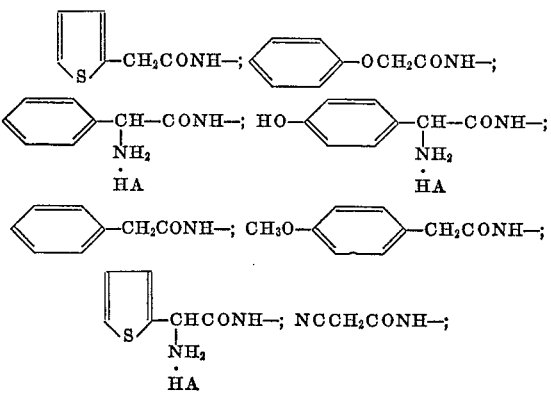

R is a member selected from the group consisting of methyl, N-pyridiniummethyl and (lower)alkanoyloxymethyl, and $R_{16}$ and $R_{17}$ are independently members selected from the group consisting of —H, lower alkoxy, halogen, phenyl(lower)alkyl, lower alkoxyphenyl, di(lower)alkylamino, carboxy(lower)alkoxy, lower alkylsulfonyl, and carb(lower)alkoxy.

2. A compound as defined in claim 1 which is

[structure]

References Cited
UNITED STATES PATENTS 3,669,980   6/1972   Bogash et al. _____ 260—243 C NICHOLAS S. RIZZO, Primary Examiner U.S. Cl. X.R.

424—246